United States Patent [19]

Cook et al.

[11] Patent Number: 4,773,277
[45] Date of Patent: Sep. 27, 1988

[54] SELF-CONTAINED POWER TAKE-OFF

[75] Inventors: Richard A. Cook, Gregory; Thomas W. Huetteman, Chelsea, both of Mich.

[73] Assignee: Dana Corporation, Toledo, Ohio

[21] Appl. No.: 929,676

[22] Filed: Dec. 17, 1986

[51] Int. Cl.$^4$ .................. F16H 3/08; F16H 37/04
[52] U.S. Cl. .................... 74/377; 74/15.63; 74/15.8; 74/369
[58] Field of Search .............. 74/15.63, 15.66, 15.8, 74/369, 377

[56] References Cited

U.S. PATENT DOCUMENTS

| | | | |
|---|---|---|---|
| 2,932,202 | 4/1960 | Rinkema | 74/15.63 X |
| 3,111,852 | 11/1963 | May et al. | 74/15.63 |
| 3,209,872 | 10/1965 | Moyer et al. | 192/13 R |
| 3,695,401 | 10/1972 | Nagasaki | 74/377 X |
| 3,952,606 | 4/1976 | Schulz | 74/377 |
| 4,498,356 | 2/1985 | Vater et al. | 74/15.63 X |
| 4,597,301 | 7/1986 | Weis et al. | 74/15.8 X |
| 4,660,425 | 4/1987 | Nerstad et al. | 74/15.66 X |

*Primary Examiner*—Leslie A. Braun
*Assistant Examiner*—Dwight G. Diehl
*Attorney, Agent, or Firm*—Irvin L. Groh; Alfred L. Patmore, Jr.

[57] ABSTRACT

A self-contained remotely actuated power take-off assembly for front mounting to an engine. A sump containing hydraulic fluid is contained within the power take-off housing to supply hydraulic fluid by a gerotor pump connected to the output shaft supplying fluid under pressure to a piston and cylinder hydraulic actuator. A friction disk clutch operatively engages a gear train between the input and output shaft when acted upon by the piston. A remotely operated solenoid valve located between the pump and hydraulic cylinder is used for such actuation.

14 Claims, 2 Drawing Sheets

SELF-CONTAINED POWER TAKE-OFF

BACKGROUND OF THE INVENTION

1. Field of the Invention

This invention relates to power take-off units, and more particularly to a self contained power take-off which is remotely actuated, and which is specifically arranged for front mounting to an engine.

2. Description of the Prior Art

There are a wide variety of power take-off units which are used in conjunction with the power transmissions of trucks, tractors and other motor vehicles to provide auxiliary power transmission for such things as driving compressors on refrigerated trucks, operating auxiliary farm equipment, operating fire truck accessories, operating tailgates and lifts on truck and the like. Examples of power take-offs of this type are shown in U.S. Pat. Nos. 2,736,202 and 3,540,290 to Wagner wherein the power take-off are mounted on the main transmission so that an idler gear in the take-off engages a transmission gear to which the take-off has been mounted.

One of the difficulties encountered where the power input is taken from the main transmission involves the drag imposed by the power take-off unit on the transmission when a shift in gears is being made, which causes problems with synchronization, to which these Wagner patents are addressed. In the earlier Wagner patent, mechanical linkage was used between the power take-off clutch mechanism and the main power transmission clutch. In the later Wagner et al patent, improved operation was obtained by the use of a hydraulically operated clutch within the power take-off unit operated from an external source of hydraulic fluid.

For practical engineering considerations, friction disk clutches are conventionally used between the input and output shafts in power take-off units. Improvement in the wear compensation of such clutching devices is another area of development in this art as shown in U.S. Pat. No. 3,724,620 to Benson, Jr.

With the development of in-line input and output shaft power take-off devices which can be directly connected to the engine, such as that shown in the Benson, Jr. patent and U.S. Pat. No. 3,561,277 to Boyle et al, came the development and standardization to a certain extent of two speed power take-off devices such as that shown in the Boyle et al patent and in U.S. Pat. Nos. 3,507,372; 3,464,277 and 4,271,942 issued to Gilbertson et al, Longshore, and Ballendux respectively.

There have been continuing improvements and refinements in the use of internal hydraulic actuators for the disk clutch mechanism as shown in the aforementioned Gilbertson et al and the Wagner 3,540,290 patents and U.S. Pat. No. 3,209,872 to Moyer et al. In the Moyer et al patent the improvement is directed to the hydraulically operated clutch and an anti-creep braking mechanism. Also shown in Moyer et al is an internal pump and built-in valving, but an external hydraulic fluid source is necessary along with mechanical linkages for actuation of the valves.

It is to further improvements in hydraulically operated power take-offs that this invention is directed.

It is a primary objective of this invention to provide a self contained remotely actuated power take-off assembly which is adapted for front mounting to an engine.

SUMMARY OF THE INVENTION

The foregoing objective and other advantages of the invention have been realized in a power take-off assembly in which the unit is self contained within a housing and which can be remotely actuated by a switch. The bottom of the housing functions as a sump for hydraulic fluid and is designed to lubricate all the various bearings and clutch friction plate structure. Input and output shafts are journalled in the housing, and a hydraulically operated clutch drive is used to drivingly connect the output shaft to the input shaft. A hydraulic pump is driven by the input shaft, and conduits interconnect the pump, sump and hydraulic actuator. A solenoid operated valve is located in one of the conduits and an operator switch is located outside the housing connected to the solenoid valve for opening and closing the valve. The switch can be conveniently located on the vehicle panel or at a convenient remote position for operator actuation. This arrangement provides remote operation for actuating the output shaft of the power take-off by way of the operator's switch, solenoid valve, pump, sump and hydraulically operated clutch device.

In a preferred embodiment the output shaft is located parallel to the input shaft with the input shaft extending outside of the housing for connection to the engine, and the output shaft extending outside the housing for connection to a power driven device. Most commonly, the power driven device is a high volume hydraulic pump for actuation of remote auxiliaries.

With the parallel input and output shafts, a first gear is fixed to the input shaft for rotation with it, and a second gear is rotatably mounted on the output shaft in engagement with the first gear. The clutch is located on the output shaft, arranged, upon engagement, to drive the output shaft through the second gear. The hydraulic operator is located on the output shaft to engage the clutch. A hydraulic pump on the input shaft supplies hydraulic fluid from the pump to the hydraulic operator, and a solenoid operated valve between the pump and hydraulic operator serves to open or close the flow of hydraulic fluid. Typically, a pressure relief valve is located in the inner-connecting conduit downstream from the pump for directing hydraulic fluid back to the sump if a predetermined relief pressure is exceeded.

The clutch takes the form of a conventional friction disk clutch with a series of innerleaved clutch disks alternatively connected to the second gear on the output shaft and the output shaft itself through an inner clutch gear. The hydraulic operator includes a cylinder and an annular piston coaxially mounted on the output shaft so that the piston can compress the clutch disks together against the inner clutch gear providing positive drive between the second gear and the inner clutch gear.

In a preferred embodiment, the hydraulic pump is a gerotor type pump with the inner gerotor element affixed to the input shaft.

DRAWING

The preferred embodiments of the invention are illustrated in the drawing in which:

FIG. 1 is a schematic view showing the operation and interconnections of the elements of this invention as they are embodied in a self-contained housing with a remote operator switch;

FIG. 2 is an end view of the power take-off assembly of this invention showing the output shaft projecting from the housing and showing the conduit interconnecting the sump with the pump and the pump with the solenoid valve and pressure release valve; and FIG. 3 is a cross-sectional view of the power take-off of this invention taken generally along line 3—3 in FIG. 2 showing the interconnecting hydraulic conduit including the passages from the solenoid operated valve through and to the cylinder of the hydraulic actuator.

DETAILED DESCRIPTION OF PRESENTLY PREFERRED EMBODIMENT

Figure 2:
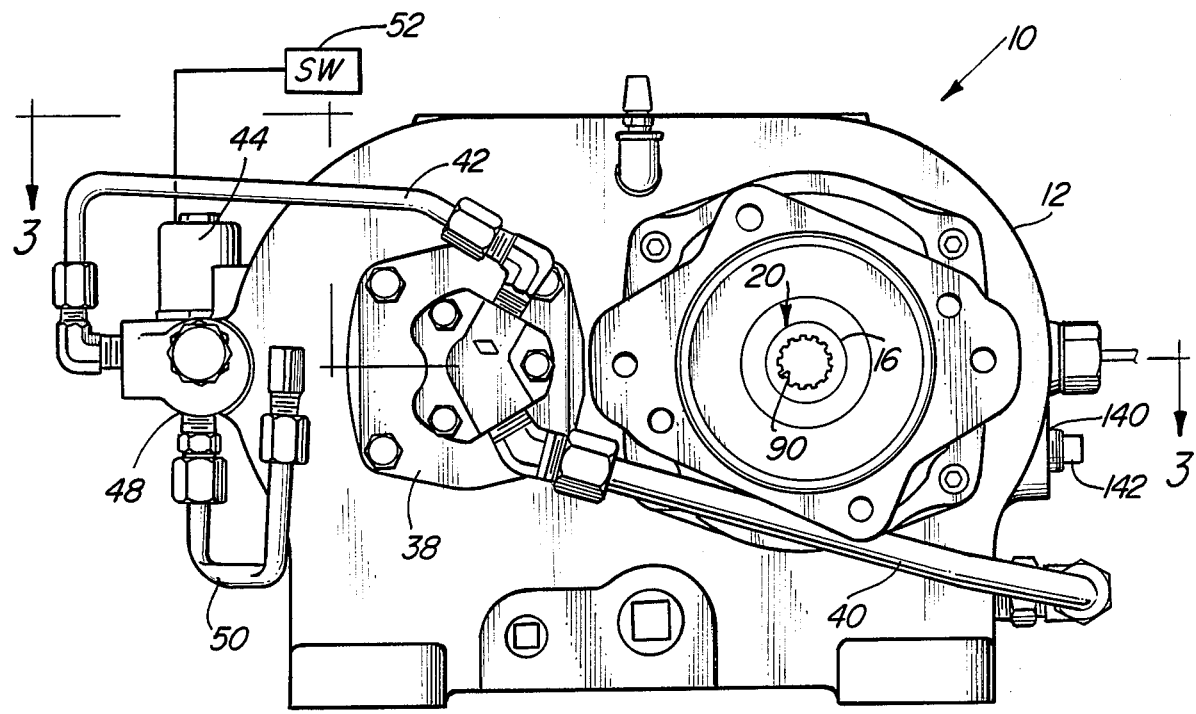

Referring to the drawing, the power take-off assembly 10 is shown as being self-contained in housing 12 having parallel input and output shafts 14 and 16 journalled in sealed relationship to the housing and having ends 18 and 20 accessible from outside the housing for attachment to an engine input and an output device respectively.

Figure 1:
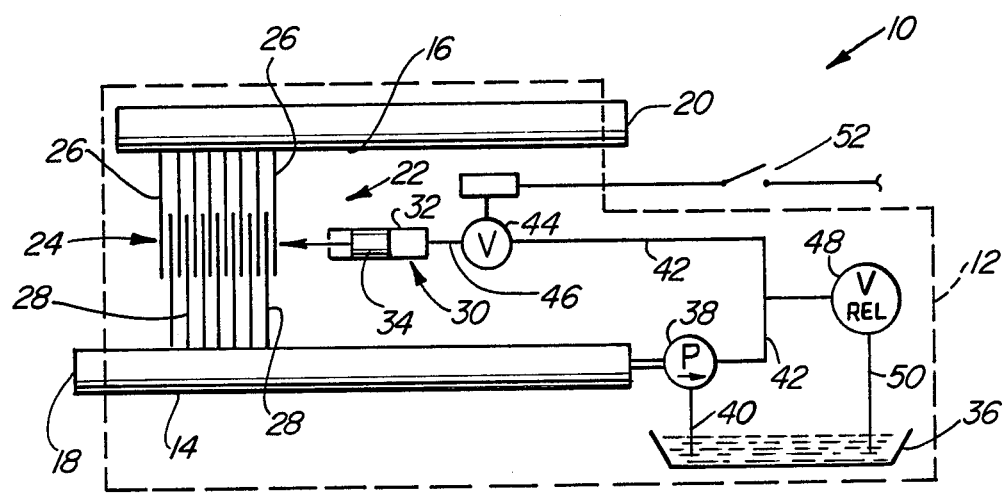

As shown schematically in FIG. 1, the output and input shafts are interconnected by a hydraulically operated clutch drive 22 including a friction disk clutch 24 having a series of interleaved clutch disks 26 and 28 alternately connected to the output and input shafts respectively. Hydraulic operator 30 includes cylinder 32 and piston 34. Hydraulic fluid is contained in sump 36 at the bottom of housing 12. Pump 38 driven by input shaft 14 draws oil from sump 36 through conduit 40 and delivers it at high pressure through conduit 42 to solenoid valve 44 and then to cylinder 32 through line 46. Pressure relief valve 48 in line 42 opens if a predetermined pressure is exceeded to deliver the hydraulic fluid back to sump 36 through return line 50 in the housing cavity. Operator switch 52 is mounted externally of the housing 12 on the vehicle instrument panel or a convenient point of use for the operator of the auxiliary equipment. It energizes the solenoid valve 44 which opens to deliver pressurized fluid through line 46 to cylinder 32 moving the piston 34 in contact with the interleaved clutch disks 26 and 28 compressing them to deliver power or rotation from the input shaft 14 to the output shaft 16.

Figure 3:
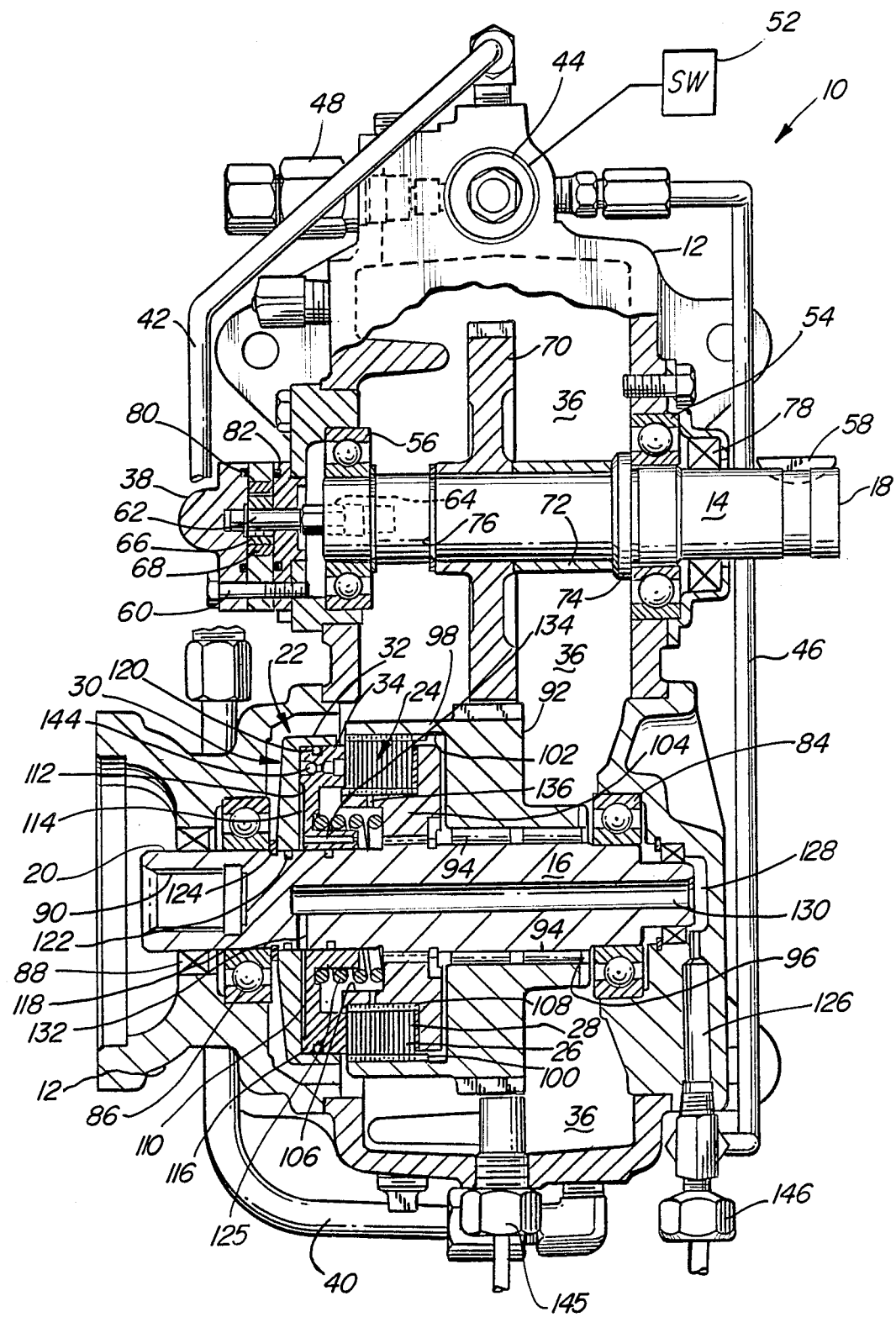

As seen in more detail in FIG. 3, the input shaft 14 is suitably mounted in sealed relationship to the housing 12 for rotation within roller bearings 54 and 56. Input shaft 14 is connected to a vehicle motor at outwardly exposed end 18 by a key 58 and sleeve (not shown). Gerotor pump 38 is attached to housing 12 by bolts 60 and has its shaft 62 driven by input shaft 14 through hexagonal plug and socket joint 64. Inner gerotor member 66 coacts with outer member 68 in a conventional fashion to raise the hydraulic fluid pressure from atmospheric inlet pressure at conduit 40 to a pressure approaching a maximum of 250 psi at which the relief valve 48 is set.

Spur gear 70 is fixed for rotation with shaft 14 by a splined connection (not shown) and is fixed against axial movement by spacer element 72 coacting with shaft shoulder 74, at one end, and snap-ring 76 at its outer end. Sealing element 78 seals the input end 18 of shaft 14, and O-ring seals 80 and 82 at the gerotor pump 38 seal the other end of shaft 14.

Output shaft 16 is journalled in sealed relationship to housing 12 in roller bearings 84 and 86 and has sealing element 88 at the outlet connection end 20. Outlet end 20 has internal splines 90 for connection to the driven auxiliary. Gear 92 is rotatably mounted on output shaft 16 by caged needle bearings 94 and is in constant mesh and rotation with gear 70 on input shaft 14. Gear 92 is restrained from axial movement at either end by snap-rings 96. Gear 92 has a radially remote annular flange 98 which extends axially to the left as viewed in FIG. 3. Spline teeth 100 extend from the inner peripheral surface 102 of flange 98.

Inner clutch gear 104 is attached to or made as an enlargement of output shaft 16 and has a radially remote annular flange 106, radially inward from flange 98 and extending to the left as viewed in FIG. 3. Spline teeth 108 extend from the outer peripheral surface of flange 106.

Friction disk clutch 24 is located in the annular spaced defined between the axially extending flanges 98 and 106. Interleaved alternate clutch disks 26 have internal peripheral splines that are engaged with the splines 108 on inner clutch disc 104. Interleaved alternate clutch discs 28 have external peripheral splines which engages splines 100 on the inner periphery 102 of axial extending flange 98 on gear 92.

Annular piston 34 is slidably mounted on output shaft 16 to the left of friction disc clutch 24 as viewed in FIG. 3. A cup-shaped cylinder 32 is slid over output shaft 16 to house annular piston 34. Annular pressure chamber 110 is formed between the juxtapositioned radially extending surfaces 112 on cylinder 32 and 114 on piston 34. A minimum depth to annular pressure chamber 110 is maintained by peripherally located annular projection 116 located at the end of annular piston 34 which coacts with radial surface 112. Inner O-ring 118 seals the inner periphery of annular piston 34 to the output shaft 16, and V-ring seal 120 maintains the seal between annular piston 34 and cup shaped cylinder 32. O-ring 122 maintains the seal between cup shaped piston 32 and output shaft 16 while snap ring 124 limits the movement to the left as seen in FIG. 3 of cylinder 32 and serves to retain roller bearing 86. The helical compression spring 125 is positioned between the piston 34 and the inner clutch gear or the enlarged portion 104 of output shaft 16 to bias the piston in a leftward direction.

To actuate hydraulic operator 30, consisting of cylinder 32 and piston 34, and thereby engage friction disc clutch 24, hydraulic fluid is sucked from the lower portion of sump 36 through conduit 40 by gerotor pump 38 which delivers high pressure fluid through conduit 42 to solenoid valve 44. When operator switch 52 is closed, solenoid valve 44 is opened to deliver the high pressure fluid through line or conduit 46 and passage 126 into chamber 128 at the enclosed end of output shaft 16. Axial passage 130 in output shaft 16 delivers the high pressure fluid to radial ports 132 and into annular pressure chamber 110. The fluid pressure causes the piston 34 to move to the right compressing the clutch disks 26 and 28 of clutch 24 to transmit torque from the input shaft 14 and gear 70 to gear 92 and inner clutch gear 104 to output shaft 16. When the solenoid switch 52 is opened, the solenoid valve 44 is closed causing decay of the high pressure in annular chamber 110 allowing the compression spring 125 to return the clutch disc 26 and 28 to their unengaged positions. Such oil flow for pressure decay and lubrication of the moving elements are well known and take place through the passages shown in FIG. 3. For example, initial pressure decay takes place through orifice passage 134 and passages 136 and 138 through the chamber occupied by compression spring 125 and the chamber occupied by the discs of clutch 24. Ball check valve 144 also opens to allow oil flow between the disk chamber and annular pressure chamber 110. Oil is introduced into sump 36 initially through opening 140 in housing 112 sealed by pipe plug 142 maintaining the oil level in the sump at that height to readily lubricate the bearings, etc.

Although forming no part of the present invention, convenient accessories are shown by way of speed sensor 145 and pressure detector 146, see FIG. 3, to provide speed and pressure indications to the operator or to act as safety interlocks to cause clutch disengagement with an overspeed or excessive pressure. Such interlocks would be in addition to the conventional high pressure relief provided by pressure relief valve 48.

The embodiments of the invention is which an exclusive property or privilege is claimed are defined as follows:

1. A self contained hydraulically actuated power take-off assembly comprising, in combination:
   a housing;
   a sump in said housing containing hydraulic fluid;
   an input shaft journalled in sealed relationship to said housing and having an end accessible from outside said housing for connection to an engine;
   an output shaft parallel to said input shaft journalled in sealed relationship to said housing and having an end accessible from outside said housing for connection to a power driven device;
   a first gear fixed to said input shaft for rotation therewith;
   a second gear rotatably mounted on said output shaft in engagement with said first gear;
   clutch means on said output shaft arranged upon engagement to drive said output shaft through said second gear;
   a hydraulic operator on said output shaft arranged upon actuation to engage said clutch means;
   a hydraulic pump driven by said input shaft;
   conduit means interconnecting said pump, sump and hydraulic operator; and
   a solenoid operated valve in said conduit means arranged to open or close the flow of hydraulic fluid from said sump, through said pump to said hydraulic operator;
   thereby providing means for actuating the output shaft of said power take-off through said solenoid valve, pump, hydraulic operator and clutch means.

2. The power take-off assembly according to claim 1 further including an operator's switch outside said housing for remotely operating said solenoid valve.

3. The power take-off assembly according to claim 1 further including a pressure relief valve in said conduit means downstream from said pump for directing hydraulic fluid to said sump if the pressure at said relief valve exceeds a predetermined value.

4. The power take-off assembly according to claim 2 wherein said hydraulic operator includes a backup cylinder and an annular piston coaxially mounted on said output shaft with said clutch disks, movement of said piston in one direction compressing said disks together, connecting said second gear and said inner clutch gear.

5. The power take-off assembly according to claim 4 wherein said pump has a suction port and a discharge port and said conduit means includes:
   a passage connecting said sump to said suction port;
   a passage connecting said discharge port with said solenoid valve; and
   a passage connecting said solenoid valve to said backup cylinder.

6. The power take-off assembly according to claim 1 wherein said clutch means includes a series of interleaved clutch disks alternately connected to said second gear and said output shaft through an inner clutch gear.

7. The power take-off assembly according to claim 6 wherein said hydraulic pump is a gerotor type pump in which the inner gerotor element is affixed to said input shaft.

8. A self contained hydraulically operated power take-off assembly comprising, in combination:
   a housing;
   a sump in said housing containing hydraulic fluid;
   an input shaft journalled in said housing;
   an output shaft journalled iin said housing;
   a first gear fixed to said input shaft for rotation therewith;
   a second gear rotatably mounted on said output shaft in engagement with said first gear;
   a hydraulically operated clutch drive for drivingly connecting said second gear to said output shaft;
   a hydraulic pump driven by said input shaft;
   conduit means interconnecting said pump, sump and hydraulically operated drive;
   a solenoid operated valve in said conduit means;
   thereby providing means for actuating the output shaft of said power take-off by hydraulic fluid in said sump delivered by said pump through said valve to said hydraulically operated clutch drive by said conduit means.

9. The power take-off assembly according to claim 8 further including an operator's switch outside said housing for remotely operating said solenoid valve.

10. The power take-off assembly of claim 8 wherein said hydraulically operated clutch drive includes a friction disk clutch.

11. The power take-off assembly of claim 10 wherein said hydraulically operated clutch drive includes a piston and cylinder hydraulic actuator.

12. The power take-off assembly of claim 11 wherein said friction disk clutch and said piston and cylinder hydraulic actuator are coaxially mounted on said output shaft.

13. The power take-off assembly of claim 12 wherein said output shaft is arranged parallel to said input shaft.

14. A self-contained remotely actuated power take-off assembly for front mounting to an engine comprising, in combination:
   a housing;
   a sump in said housing containing hydraulic fluid;
   an input shaft journalled in sealed relationship to said housing and having an end accessible from outside said housing for connection to an engine;
   an output shaft parallel to said input shaft journalled in sealed relationship to said housing and having an end accessible from outside said housing for connection to a power driven device;
   a first gear fixed to said input shaft for rotation therewith;
   a second gear rotatably mounted on said output shaft in engagement with said first gear;
   a piston and cylinder hydraulic operator coaxially mounted on said output shaft;
   an inner clutch gear coaxially fixed to said output shaft;
   a friction disk clutch coaxially mounted on said output shaft between said piston and said inner clutch gear having a series of interleaved clutch disks alternately connected to said second gear and said inner clutch gear;
   a hydraulic pump driven by said input shaft;

conduit means interconnecting said pump, sump and hydraulic cylinder;

a solenoid operated valve in said conduit means downstream of said pump;

an operator switch outside of said housing connected to said solenoid valve to open or close said valve and the flow of hydraulic fluid from said sump through said pump to said hydraulic cylinder;

thereby providing means for remotely actuating the output shaft to said power take-off assembly by compression of said clutch disks by said piston against said inner clutch gear drivingly connecting said second gear to said output shaft.

* * * * *